United States Patent
Conn et al.

(10) Patent No.: US 6,763,094 B2
(45) Date of Patent: Jul. 13, 2004

(54) METHOD AND DEVICE FOR CREDITING A CREDITABLE MACHINE

(75) Inventors: Edward Conn, Hertfordshire (GB); Jay Pritchard, Somerset (GB); Vernon Collin, West Midlands (GB)

(73) Assignee: Air Pay Limited, Hertfordshire (GB)

( * ) Notice: Subject to any disclaimer, the term of this patent is extended or adjusted under 35 U.S.C. 154(b) by 39 days.

(21) Appl. No.: 09/937,471

(22) PCT Filed: Jan. 23, 2001

(86) PCT No.: PCT/GB01/00260
§ 371 (c)(1),
(2), (4) Date: Sep. 24, 2001

(87) PCT Pub. No.: WO01/54087
PCT Pub. Date: Jul. 26, 2001

(65) Prior Publication Data
US 2002/0154749 A1 Oct. 24, 2002

(30) Foreign Application Priority Data
Jan. 24, 2000 (GB) .............................................. 0001548

(51) Int. Cl.$^7$ ............................................ H04M 11/00
(52) U.S. Cl. ................................ 379/91.01; 455/414.1; 705/44; 705/64
(58) Field of Search ............................ 379/91.01, 91.02, 379/93.12, 93.13, 144.01; 455/406, 411, 414.1; 705/64, 26, 44, 21

(56) References Cited

U.S. PATENT DOCUMENTS

| | | | |
|---|---|---|---|
| 5,608,778 A | * | 3/1997 | Partridge, III ............... 455/411 |
| 6,195,541 B1 | * | 2/2001 | Griffith ........................ 455/406 |
| 6,356,752 B1 | * | 3/2002 | Griffith ........................ 455/406 |

FOREIGN PATENT DOCUMENTS

| | | | |
|---|---|---|---|
| EP | 0848360 | * | 6/1998 |
| WO | WO 98/34203 | * | 8/1998 |
| WO | WO 98/54678 | * | 12/1998 |
| WO | WO 99/33034 | * | 7/1999 |

\* cited by examiner

Primary Examiner—Wing Chan
(74) Attorney, Agent, or Firm—Fay, Sharpe, Fagan, Minnich & McKee, LLP

(57) ABSTRACT

A vending machine, meter or gaming machine crediting method and a device for implementing the method is disclosed. A creditable machine such as a vending machine, gaming machine or payment meter such as a parking meter generally requires the deposition of cash or the use of a magnetic or electronic payment card in order to be enabled. The use of cash or card readers implies security and other problems. The payment system of the present invention provides the creditable machine with a telephone interface device able to telecommunicate with a remote pay center by wire or preferably wireless telephony. To enable the creditable machine, a user communicates data to the pay center by means of a mobile cell phone or other wireless communicator. The pay center is able to check a user's account and other transaction details and issue instruction to the creditable machine to enable the requested transaction.

11 Claims, 2 Drawing Sheets

METHOD AND DEVICE FOR CREDITING A CREDITABLE MACHINE

Figure 1:
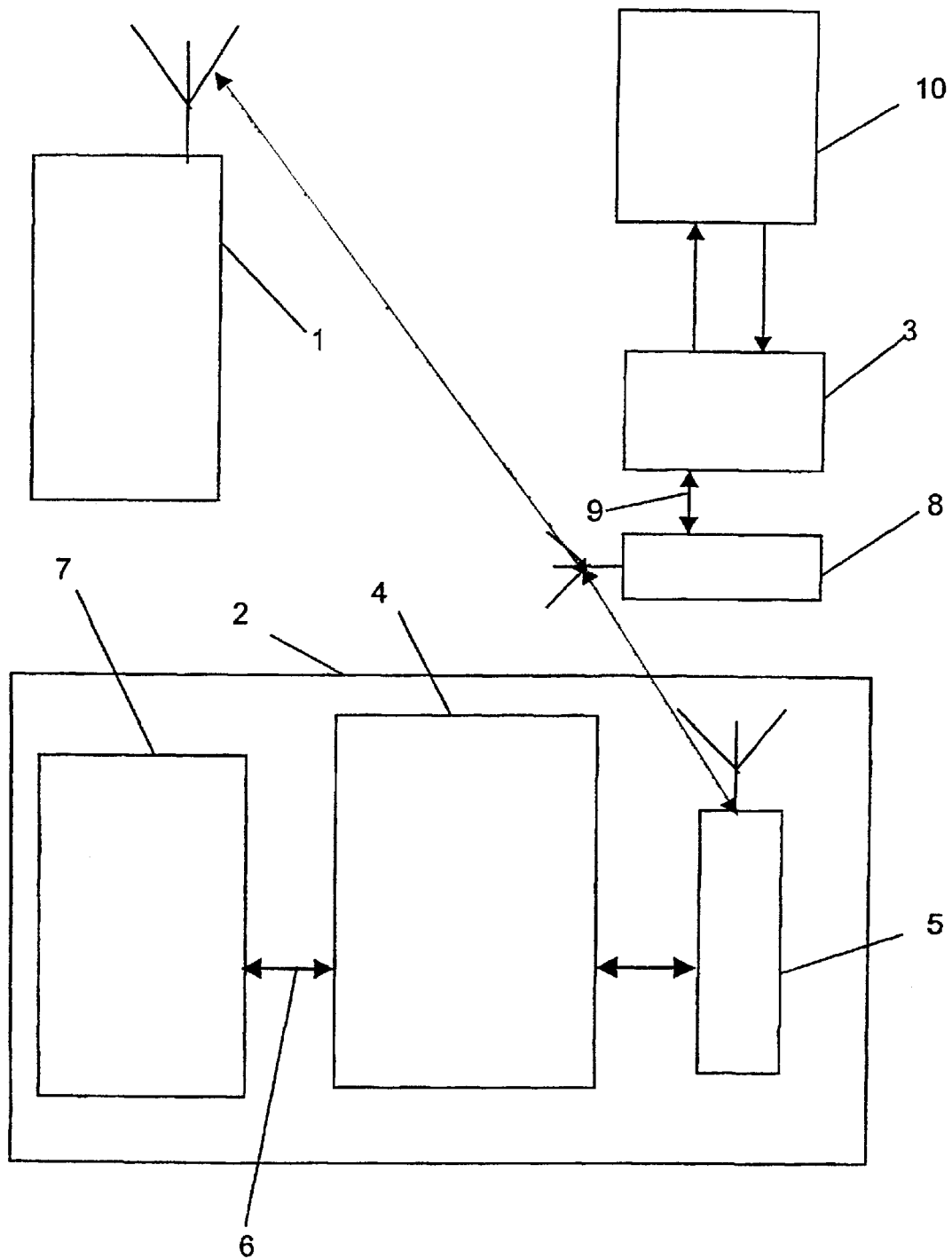

The present invention is concerned with a telecommunications system for crediting a vending machine, meter, such as a parking meter, amusement machine, video game machine, change machine, gaming machine or other cash or coin operable device. Machines and devices to which the present invention may be applied will herein be known as creditable machines.

Conventionally creditable machines must be credited by means of cash or the use of a magnetic or electronic payment card (sometimes known as a smart card) such as a credit card. Cash presents a number of problems to both the customer desiring to use the creditable machine and the proprietor of the creditable machine in that the user must have the correct currency and the proprietor must regularly empty the cash accumulated in a safe of the creditable machine. The latter action implies problems of security and labour in banking the cash. The machine is always a security risk as the cash presents a tempting target for theft. The use of payment cards alleviates some of these problems, however, the customer still needs to have a payment card valid for the machine. A similar problem exists for street vendors such as market traders who have particular difficulty in maintaining cash floats and security. The present invention seeks to alleviate the aforementioned problems. According to the present invention there is provided a method for crediting a creditable machine provided with a telephone interface device by means of a separate telephone crediting machine and a remote pay centre server comprising the steps of:

(i) operating the telephone crediting machine to contact the pay centre server and communicate a customer identification code to the pay centre server, (ii) operating the telephone crediting machine to communicate a telephone interface device identification code, displayed on the creditable machine, to the pay centre server, (iii) the pay centre server responding to the interface device identification code by sending a transaction data request message to the user, (iv) the user sending the transaction data to the pay centre server by means of the telephone crediting machine, (v) the pay centre server interrogating user account data for approval of the transaction, and if the transaction is approved, logging the transaction data at the pay centre server, (vi) sending an enable signal to the telephone interface device, (vii) the telephone interface device responding to the enable signal by sending a credit signal to the creditable machine.

The credit signal delivered to the creditable machine will include currency data in accordance with the transaction data received from the crediting machine. The creditable machine will then be enabled to vend goods, games credits or services to the value of the currency data as if the transaction had been implemented conventionally.

After the step (vii) the pay centre server will log the transaction details in memory. Before the lines of communication are closed the telephone interface device may signal that the creditable machine has performed as required, e.g., has vended the goods or services and/or recorded the transaction details. The method may include the step of offering to establish an account with the pay centre server operator when new customer's telephone a number displayed on the creditable machine. The method may permit the logged transaction data to be read out or to be interrogated remotely.

In order to ensure the security of transactions the method may also comprise the steps of:

the pay centre server responding to the creditable machine identification code to generate and transmit a random security code to the telephone interface device for display, operating the crediting machine to communicate the random security code from the telephone interface device to the pay centre server, the pay centre server comparing the random security code as sent to the telephone interface device and the random security code as received from the telephone crediting machine and proceeding with the transaction by the step of sending a transaction data request message only if the sent and received random security codes match.

The method preferably relies on wireless communication using cellular telephony, particularly GSM or its successors such as G3. In general throughout this specification the term GSM should be understood accordingly. The crediting machine may be a GSM telephone with data input and transmission by use of the keypad or it may be any other device capable of GSM communication. To minimise the costs of the transaction the line of communication between the pay centre server and the crediting machine is preferably disconnected as soon as the transaction data is received.

According to another aspect of the present invention there is provided a telephone interface device for installation in a creditable machine comprising a communicator for telecommunication with a remote pay centre server, and means to enable the creditable machine whereby said telephone interface device is responsive to transaction signals transmitted from the remote server to send a credit signal to the creditable machine.

Most commonly it is envisaged that the creditable machine will be a vending machine or gaming machine. In this situation enabling the vending machine will result in the machine vending goods or services. In the case of a gaming machine the game will be enabled and so be played. In some cases the creditable machine will be a meter such as a parking meter, in which instance the meter may respond by indicating a credited parking time or issuing a ticket/receipt for credited parking or indicating some other form of credited product or service. It is also envisaged that the creditable machine may be a machine employed by a vendor to execute a transaction, this may be particularly useful to street vendors or others without convenient access to fixed landline facilities. In this case the creditable machine will indicate a credit transfer from a purchaser's account to a vendors account.

The telephone interface device will often be retrofitted to a preexisting creditable machine. The interface device may have its own controller to manage the actions of the communicator, a display and the enabling means. The interface device is preferably provided with a memory capable of logging the transaction data locally and may provide for enabling the creditable machine by communicating with an electronic control system including a credit register of the creditable machine.

For security and ease of installation it is preferable that the interface device communicator is a wireless (GSM) communicator. The communicator will communicate data in an encrypted form for security. Preferably the device will include a memory whereby transactions can be logged. The pay centre server will preferably be connected to a global cellular (GSM) network by a landline and will preferably be capable of establishing simultaneous lines of communication with each of the crediting machine and the creditable machine.

Although the term "display" has been used and suggests a visual display device which might be any of a simple label to a CRT, LED, LCD or mechanical visual display, the term for these purposes may also include synthesised or recorded voice communication, braille or some combination of such display devices.

Figure 2:
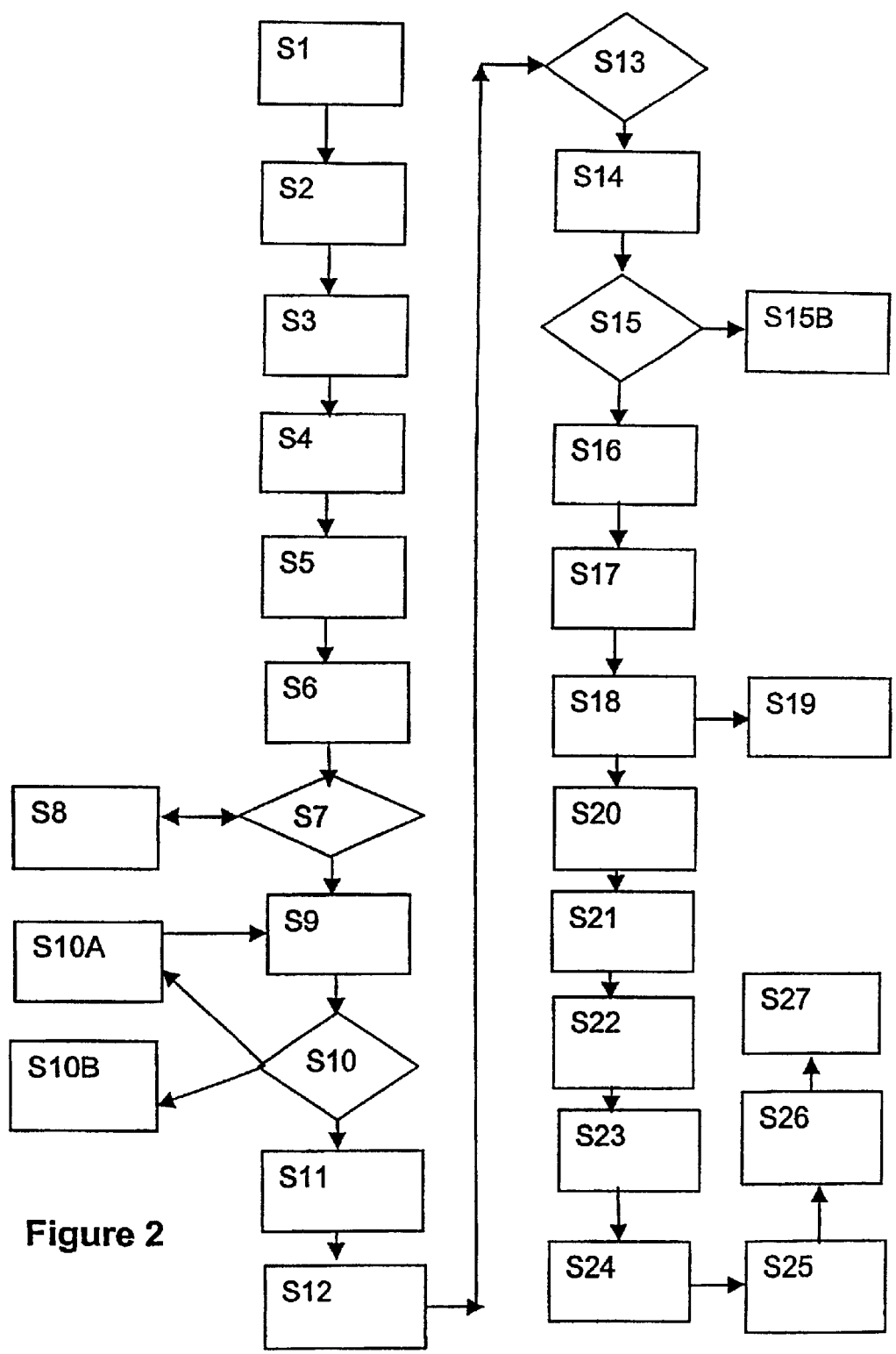

A method and telephone interface device system embodying the invention will now be described by way of example with reference to the accompanying drawings wherein FIG. 1 is a diagram of the system components and FIG. 2 is a flow chart of the method.

FIG. 1 shows a crediting machine in the form of a conventional GSM telephone 1. A creditable machine exemplified by a vending machine 2 and a remote pay centre 3. The vending machine is provided with a telephone interface device 4 having a GSM module 5 for wireless communication of data with the pay centre 3. The telephone number of the pay centre 3 and a telephone interface device identification code are displayed on the machine either by means of a printed notice or preferably by means of a display provided by a display screen. The display screen will preferably be a part of the telephone interface device 4.

The telephone interface device 4 is also provided with serial and parallel input and output 6 for communication with a control system 7 of the vending machine 2. The telephone interface device 4 may be provided with a sensor interface capable of reading data from sensor systems on board the vending machine. An isolating buffer circuit (not illustrated) is provided in the telephone interface device 4 to assist in management of communication between the telephone interface device 4 and the control system 7. Software installed in the telephone interface device 4 enables the telephone interface device to identify and manage the control of the control system 7.

Data transmitted between the telephone interface device 4 and the pay centre 3 is encrypted to provide a high standard of security.

The telephone interface device 4 also includes a memory (not shown) in which transaction details are logged which may then be displayed on a screen built into the telephone interface device 4 or retrieved by means of a hand held interrogator. The telephone interface device 4 also includes a stand alone power supply at least sufficient to permit a controlled shut down of the telephone interface device 4 in the event of a mains power failure and hence to maintain the logged transaction data until mains power can be restored.

The pay centre server 3 is connected to a GSM network 8 by means of a landline 9 for wireless communication with the GSM telephone 1 and the telephone interface device 4 and a network connection to a banking server 10.

Referring to FIG. 2 the method for crediting the vending machine in order to effect a transaction is as follows:

At S1 the user arrives at the vending machine 2. At S2 the user reads the telephone number of the pay centre server and the telephone interface device identification code. Using the GSM telephone 1 the user calls the pay centre server telephone number at step S3. The call is answered by the pay centre server and the user is asked for a customer identification code which in this case will be a unique personal identification number (PIN). The customer transmits the PIN at step S7 which is then compared with recorded PINs in a database. If the PIN does not match a recorded PIN or there is no PIN transmitted the user Is referred to an operator to address a problem or establish an account.

If the PIN is approved at step S7 the user is prompted to transmit the telephone interface device identification code displayed on the vending machine. At step S10 the user enters and confirms the telephone interface device identification code. The telephone interface device identification code is compared with a database of telephone interface device identification codes. If no telephone interface device identification code match can be found in the database the user is prompted to send the telephone interface device identification code again at step S10A. If the vending machine or telephone interface device identification code is out of order the user is directed to assistance such as help at a call centre.

If the telephone interface device identification code is matched from the data base the pay centre server 3 generates a random security code, establishes communication with the telephone interface device identified as corresponding to the telephone interface device identification code and transmits the code to the identified telephone interface device. The identified telephone interface device 4 reacts by displaying the code on a display screen at step S11 and at step S12 the user is prompted to read and send the random security code to the pay centre server 3.

At step S13 the user transmits the random security code to the pay centre server which compares the random security code received from the user with a record of the random security code stored in memory at step 14. If the random security codes match it is confirmed that the telephone interface device to be credited is correct and the transaction can proceed to step S15 where the user is prompted for the value of the transaction.

At step S16 the user transmits the value of the transaction to the pay centre server 3 using the GSM phone 1.

At step 17 and 18 the pay centre server 3 interrogates account data relating to the user to confirm that funds are available. This is achieved by linking with a banking server gateway at step 17 and interrogating user account data at the banking server. If insufficient funds are available the user is redirected to a call centre at step 19. If sufficient funds are available the procedure goes to step S20.

At step S20 the security of the telephone interface device 3 is checked. At step S21 the user is instructed to hang up, cancel the transaction or wait for the telephone interface device 4 to credit the vending machine 7.

If the user continues with the transaction the procedure goes to stop S22 where the users funds are credited from a users account to a vending machine account. At the same time a record of the transaction is transmitted to the telephone interface device 4 where the telephone interface device 4 will interface with the vending machine 7 to vend the requested goods or services at step S24.

At step S25 the telephone interface device 4 communicates that the goods have been vended to the pay centre server 3. The lines of communication between the pay centre server 3 the telephone interface device 4 and the users GSM phone 1 are terminated at step S26 and the telephone interface device 4 ends the procedure at step 27 by logging the transaction data.

What is claimed is:

1. A telephone interface device in a cash or coin operable device which includes a credit register and comprising a communicator for telecommunication with a remote pay centre server wherein the telephone interface device is adapted to send a credit signal including transaction data to the credit register and the telephone interface device having a sensing interface to interact with sensors of a control system in a cash or coin operable device, the pay centre server including means responsive to the telephone interface device identification code to generate a random security code and transmit the random security code to the telephone interface device, said telephone interface device providing means for the display of the random security code, said pay centre server having means adapted to await reception of the random security code from the telephone crediting machine, a comparator to compare the random security code received from the telephone crediting machine and the random security code as generated by the pay center server and means responsive to the comparator only when the random security codes match to proceed with the transaction.

2. A method for crediting a cash or coin operable device with a credit register and a telephone interface device by means of a separate telephone crediting machine and a remote pay centre server comprising the steps of:

(i) operating the telephone crediting machine to contact the pay centre server and communicate a user identification code to the pay centre server, (ii) operating the telephone crediting machine to communicate a displayed telephone interface device identification code, to the pay centre server, (iii) the pay centre server responding to the telephone interface device identification code by sending a transaction data request message to the user, (iv) the user sending the transaction data to the pay centre server by means of the telephone crediting machine, (v) the pay centre server interrogating user account data for approval of the transaction, and if the transaction is approved, logging the transaction data at the pay centre server, (vi) sending an enable signal to the telephone interface device, (vii) the telephone interface device responding to the enable signal by sending a credit signal to the cash or coin operable device, and (viii) the step of sending a credit signal comprises sending the credit signal to the credit register so that the credit register registers a credit corresponding to a sum of currency communicated by the transaction data.

3. A method according to claim 2 wherein the cash or coin operable device is any of: a vending machine, gaming machine, meter, amusement machine, video game machine, change machine and gambling machine.

4. A method according to claim 2 in which the steps of communication are implemented by wireless communication using a cellular phone network.

5. A method according to claim 4 comprising the step of the pay centre server responding to reception of the transaction data by disconnecting the wireless line to the crediting machine.

6. A telephone interface device in a cash or coin operable device communicating with a credit register and comprising a communicator for telecommunication with a remote pay centre server wherein the telephone interface device is adapted to send a credit signal including transaction data to the credit register and said credit register responding to the credit signal in accordance with the transaction data to enable the cash or coin operable device in accordance with the sum of currency communicated by the transaction data.

7. A telephone interface device according to claim 6 wherein the telephone interface device is adapted by means of parallel and serial ports to communicate with the cash or coin operable device electronic control system including the credit register.

8. A telephone interface device according to claim 6 wherein the communicator is a wireless communicator adapted for communication of data over a global cellular network.

9. A telephone interface device according to claim 6 having a sensing interface to interact with sensors of a control system in a cash or coin operable device.

10. A telephone interface device according to claim 6 in combination with the pay centre server, wherein the pay centre server is adapted to receive a wireless telecommunication signal from a telephone crediting machine, the signal comprising a telephone interface device identification code, a user identification code and transaction data, the pay centre server including, means responsive to the user identification code and the transaction data to interrogate a user account database and allow or deny the transaction according to the transaction data, means responsive to the telephone interface device identification code to establish wireless communication with the telephone interface device corresponding to the telephone interface device identification code and transmit transaction data to the telephone interface device.

11. A method for crediting a cash or coin operable device provided with a telephone interface device by means of a separate telephone crediting machine and a remote pay centre server comprising the steps of:

(i) operating the telephone crediting machine to contact the pay centre server and communicate a user identification code to the pay centre server, (ii) operating the telephone crediting machine to communicate a displayed telephone interface device identification code to the pay centre server, (iii) the pay centre server responding to the telephone interface device identification code by sending a transaction data request message to the user, (iv) the user sending the transaction data to the pay centre server by means of the telephone crediting machine, (v) the pay centre server interrogating user account data for approval of the transaction, and if the transaction is approved, logging the transaction data at the pay centre server, (vi) sending an enable signal to the telephone interface device, (vii) the telephone interface device responding to the enable signal by sending a credit signal to the cash or coin operable device, (viii) the step of sending a credit signal comprises sending the credit signal to the credit register so that the credit register registers a credit corresponding to a sum of currency communicated by the transaction data;

(ix) the pay centre server responding to the telephone interface device identification code to generate and transmit a random security code to the telephone interface device for display, (x) operating the telephone crediting machine to communicate the random security code received by the telephone interface device to the pay centre server, and (xi) the pay centre server comparing the random security code as sent to the telephone interface device and the random security code as received from the telephone crediting machine and proceeding with the transaction by the step of sending the transaction data request message only if the sent and received random security codes match.

* * * * *